United States Patent
Hale

(10) Patent No.: US 6,637,553 B1
(45) Date of Patent: Oct. 28, 2003

(54) MOUNTING STUD RETENTION SYSTEM FOR USE IN A VEHICLE DRUM-IN-HAT DISC BRAKE ASSEMBLY

(75) Inventor: Peyton Hale, Jackson, MI (US)

(73) Assignee: Kelelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/157,281

(22) Filed: May 29, 2002

(51) Int. Cl.$^7$ .............................................. F16D 63/00
(52) U.S. Cl. .................. 188/70 R; 188/206 A
(58) Field of Search .................. 188/70 R, 329, 188/330, 343, 206 A, 325, 106 F, 106 A

(56) References Cited

U.S. PATENT DOCUMENTS

| | | | | |
|---|---|---|---|---|
| 4,813,516 A | * | 3/1989 | Urban | 188/79.55 |
| 4,854,423 A | | 8/1989 | Evans et al. | |
| 5,180,037 A | * | 1/1993 | Evans | 188/70 R |
| 5,398,999 A | | 3/1995 | Last | |
| 5,590,742 A | * | 1/1997 | Gutelius | 188/70 R |
| 6,360,852 B1 | | 3/2002 | Sherman, II et al. | |

FOREIGN PATENT DOCUMENTS

| | | |
|---|---|---|
| DE | 36 39 774 | 6/1988 |
| EP | 0 547 522 | 6/1993 |

* cited by examiner

Primary Examiner—Christopher P. Schwartz
(74) Attorney, Agent, or Firm—MacMillan, Sobanski & Todd, LLC

(57) ABSTRACT

This invention relates to a mounting stud retention system for use in a vehicle drum-in-hat disc brake assembly. The brake assembly includes a backing plate and a drum-in-hat adapter. The backing plate has a centrally located aperture and a plurality of first openings formed therein about the centrally located aperture thereof and a plurality of second openings formed therein. Each of the first openings has at least one raised tab provided thereon adjacent the opening. The drum-in-hat adapter has a centrally located aperture and a plurality of openings adapted to be aligned with the first openings of the backing plate. The brake assembly includes a fastener extending through each of the second openings of the backing plate and into the drum-in-hat adapter to thereby secure the backing plate to the drum-in-hat adapter. The brake assembly further includes a mounting stud disposed in and extending through each of the first openings of the backing plate and the openings of said drum-in-hat adapter to thereby secure the drum-in-hat adapter to an associated component of the vehicle. In accordance with the present invention, the raised tab of the backing plate is operative to capture and retain the mounting stud in the openings of the backing plate and the drum-in-hat adapter prior to assembly of the vehicle drum-in-hat disc brake assembly to the vehicle.

20 Claims, 8 Drawing Sheets

See Fig. 3

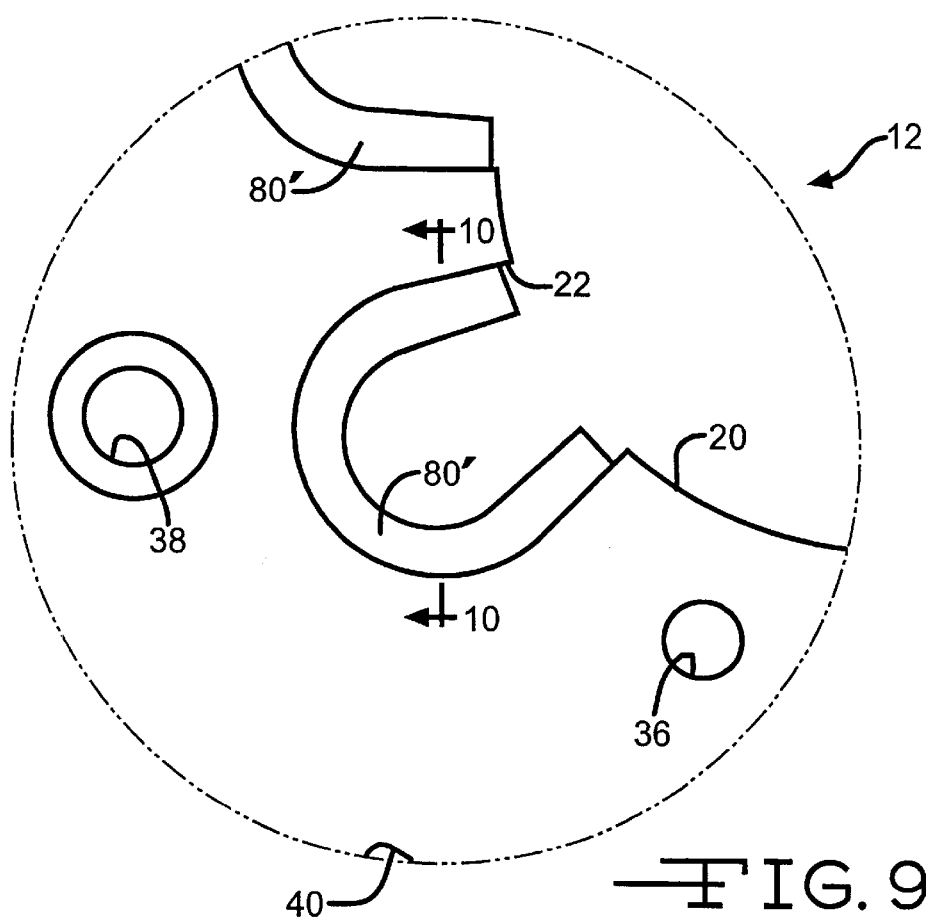
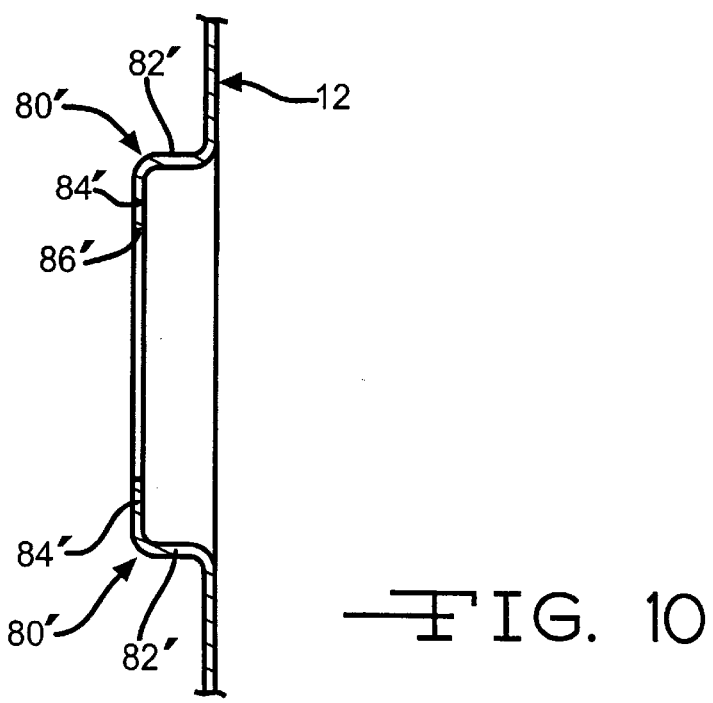

MOUNTING STUD RETENTION SYSTEM FOR USE IN A VEHICLE DRUM-IN-HAT DISC BRAKE ASSEMBLY

BACKGROUND OF THE INVENTION

This invention relates in general to vehicle brake assemblies and in particular to a mounting stud retention system for use in such a vehicle drum-in-hat disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. To accomplish this, typically two threaded bolts extend through the mounting flange and are received in threaded apertures provided in the non-rotatable vehicle component to thereby secure the mounting flange to the non-rotatable vehicle component. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. To accomplish this in the case of the former type of structure, typically four threaded bolts extend through openings provided in the backing plate and through openings provided in the mounting flange and nuts installed thereon to secure the backing plate to the mounting flange. In order to retain the bolts in place during shipment, there are two known methods that are commonly used. In one method, the bolts have serrations provided along a portion thereof which frictionally engage the surface of the opening provided in the mounting flange. In the other method, the openings of the backing plate are generally D-shaped and threadably engage a portion of the thread of the bolt.

Each of the brake shoes of the drum-in-hat parking and emergency brake has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY OF THE INVENTION

This invention relates to a mounting stud retention system for use in a vehicle drum-in-hat disc brake assembly. The brake assembly includes a backing plate and a drum-in-hat adapter. The backing plate is adapted to support a drum brake shoe assembly of a drum-in-hat parking and emergency brake portion of the drum-in-hat disc brake assembly. The drum-in-hat adapter is adapted to support a disc service brake portion of the drum-in-hat disc brake assembly. The backing plate has a centrally located aperture and a plurality of first openings formed therein about the centrally located aperture-thereof and a plurality of second openings formed therein. Each of the first openings has at least one raised tab provided thereon adjacent the opening. The drum-in-hat adapter has a centrally located aperture and a plurality of openings adapted to be aligned with the first openings of the backing plate. The brake assembly includes a fastener extending through each of the second openings of the backing plate and into the drum-in-hat adapter to thereby secure the backing plate to the drum-in-hat adapter. The brake assembly further includes a mounting stud disposed in and extending through each of the first openings of the backing plate and the openings of said drum-in-hat adapter to thereby secure the drum-in-hat adapter to an associated component of the vehicle. In accordance with the present invention, the raised tab of the backing plate is operative to capture and retain the mounting stud in the openings of the backing plate and the drum-in-hat adapter prior to assembly of the vehicle drum-in-hat disc brake assembly to the vehicle.

Other advantages of this invention will become apparent to those skilled in the art from the following detailed description of the preferred embodiments, when read in light of the accompanying drawings.

BRIEF DESCRIPTION OF THE DRAWINGS

FIG. 9 is an enlarged view of a portion of the backing plate illustrated in FIG. 8.

FIG. 10 is a sectional view of taken along line 10—10 of FIG. 9.

DETAILED DESCRIPTION OF THE PREFERRED EMBODIMENTS

Figure 1:
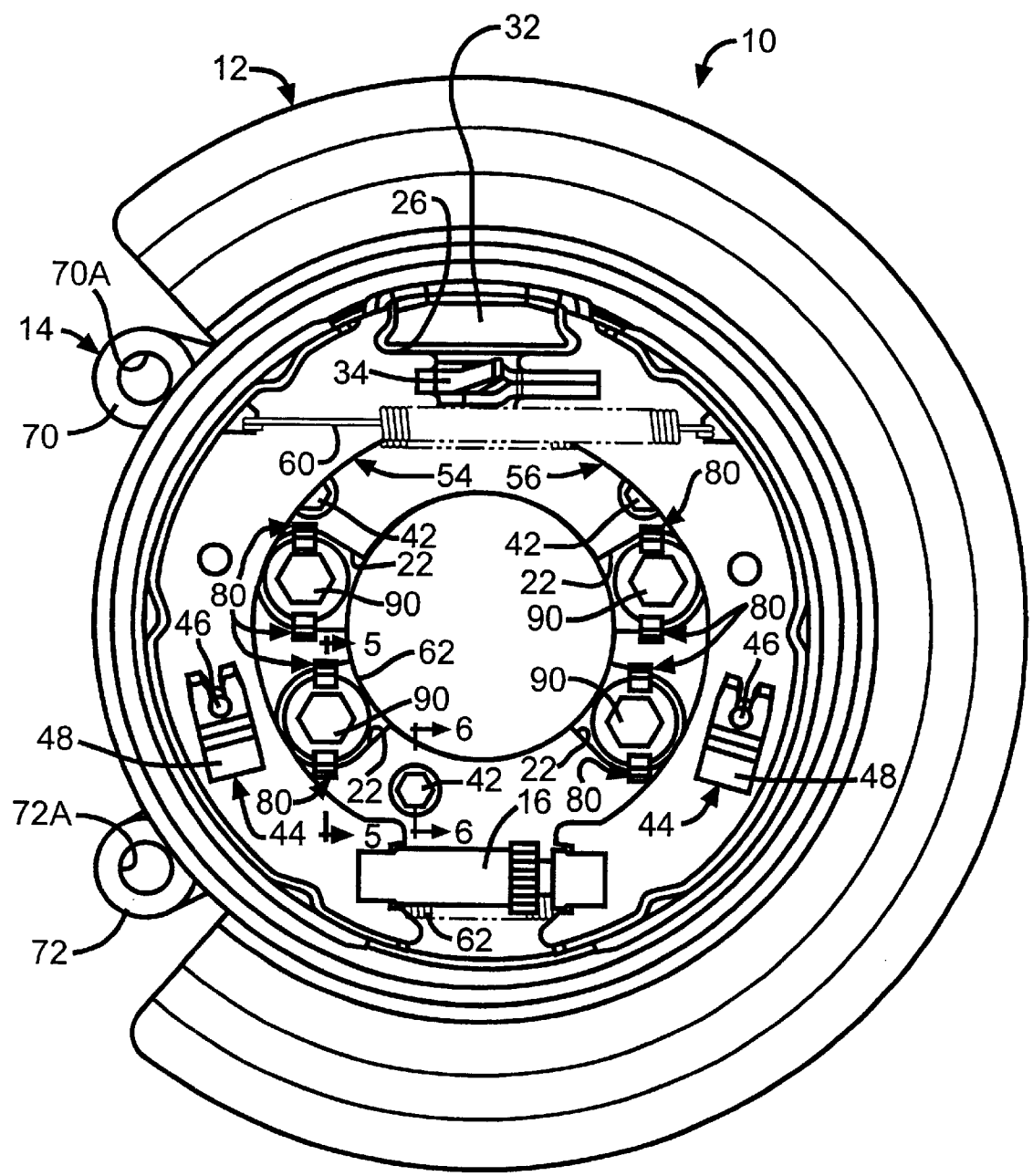
FIG. 1 is a plan view of a portion of a drum-in-hat disc brake assembly including a first embodiment of a mounting stud retention system in accordance with the present invention.
Figure 2:
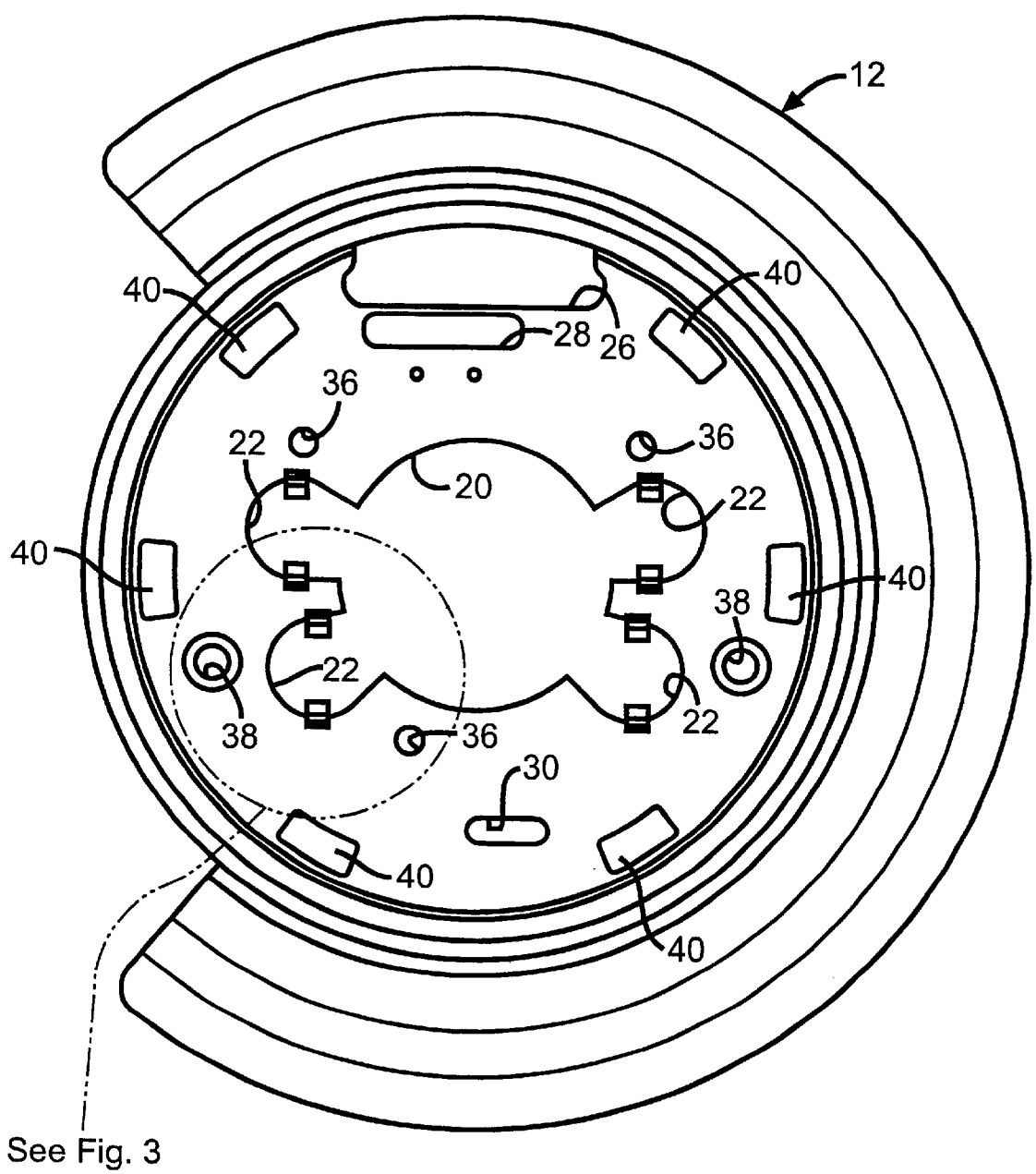
FIG. 2 is a plan view of the backing plate illustrated in FIG. 1.
Figure 3:
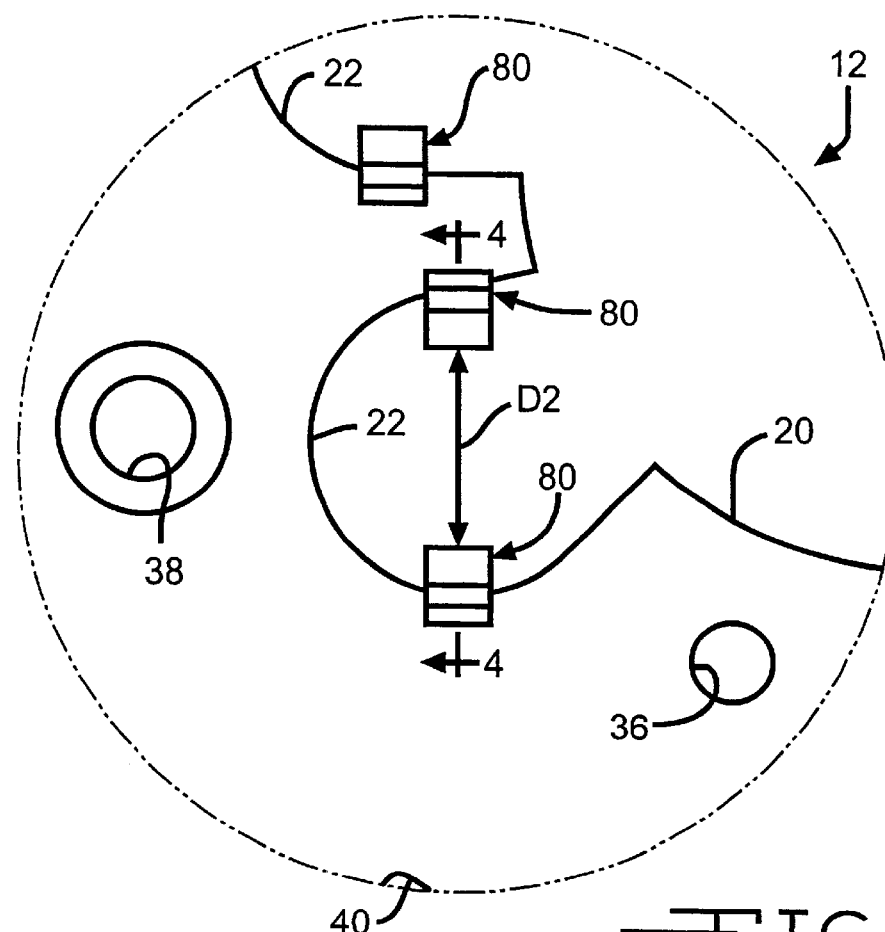
FIG. 3 is an enlarged view of a portion of the backing plate illustrated in FIG. 2.

Referring now to the drawings, there is illustrated in FIG. 1 a portion of a drum-in-hat disc assembly, indicated generally at 10, including a first embodiment of a mounting stud or bolt retention system in accordance with the present invention. The drum-in-hat disc brake assembly 10 includes a hydraulically or pneumatically actuated disc service brake (not shown), and a drum-in-hat parking and emergency brake. The general structure and operation of the drum-in-hat disc brake assembly 10 is conventional in the art. Thus, only those portions of the drum-in-hat disc brake assembly 10 which are necessary for a full understanding of this invention will be explained and illustrated in detail. Although this invention will be described and illustrated in conjunction with the particular vehicle drum-in-hat disc brake assembly 10 disclosed herein, it will be appreciated that this invention may be used in conjunction with other drum-in-hat disc brake assemblies.

The illustrated drum-in-hat disc brake assembly 10 includes a backing plate or shield 12 and a drum-in-hat adapter 14. The backing plate 12 is preferably a stamped metal backing plate and includes a relatively large central opening 20 and a plurality of openings 22 formed therein about the central opening 20. In the illustrated embodiment, the backing plate 12 is provided with four of such openings 22 in accordance with the mounting stud retention system of the present invention as will be discussed below. The central opening 20 permits an outer end of a rotatable axle (not shown) to extend therethrough to a wheel (not shown) of the vehicle. Alternatively, the structure of the backing plate 12 can be other than illustrated if so desired. For example, the number, location and/or the structure of one or more of the openings 22 can be other than illustrated if so desired.

In the illustrated embodiment, the backing plate 12 also includes a generally elongated, slotted first opening 26, a generally elongated, slotted second opening 28, and a generally elongated slotted third opening 30. The first slotted opening 26 is adapted to allow an abutment member 32 of the drum-in-hat adapter 14 to extend therethrough. The second slotted opening 28 is adapted to allow a lever 34 of an actuator mechanism (not shown) of the parking and emergency brake to extend therethrough. The third slotted opening 30 is adapted to allow an adjustment tool (not shown) to extend therethrough in order to adjust a pad wear adjustment mechanism 16 of the drum-in-hat disc brake assembly 10.

The backing plate 12 further includes a plurality of openings 36, a plurality of openings 38, and a plurality of pad rests 40. In the illustrated embodiment, the backing plate 12 is provided with three of such openings 36, two of such openings 38, and six of such pad rests 40. Alternatively, the number, location and/or structure of one or more of the openings 36, openings 38 and/or the pad rests 40 can be other than illustrated if so desired. As will be discussed below, the openings 36 are adapted to receive suitable fasteners 42 (shown in FIG. 6), to secure the backing plate 12 to the drum-in-hat adapter 14. The openings 38 are adapted to receive pins 44A of conventional pivot pin and spring-clip assemblies 44. The pins 44A are adapted to extend through the openings 38 of the backing plate 12 and through associated openings provided in a pair of brake shoes 54 and 56, respectively. The pins 44 have outer ends which are adapted to be fastened or secured to clips 46 of the spring-clip assemblies 44 to secure the brake shoes 54 and 56 to the backing plate 12 in a conventional manner. The illustrated drum-in-hat brake assembly 10 also includes a pair of retraction springs 60 and 62. Alternatively, the construction of the drum-in-hat brake assembly 10 can be other than illustrated if so desired.

Figure 5:
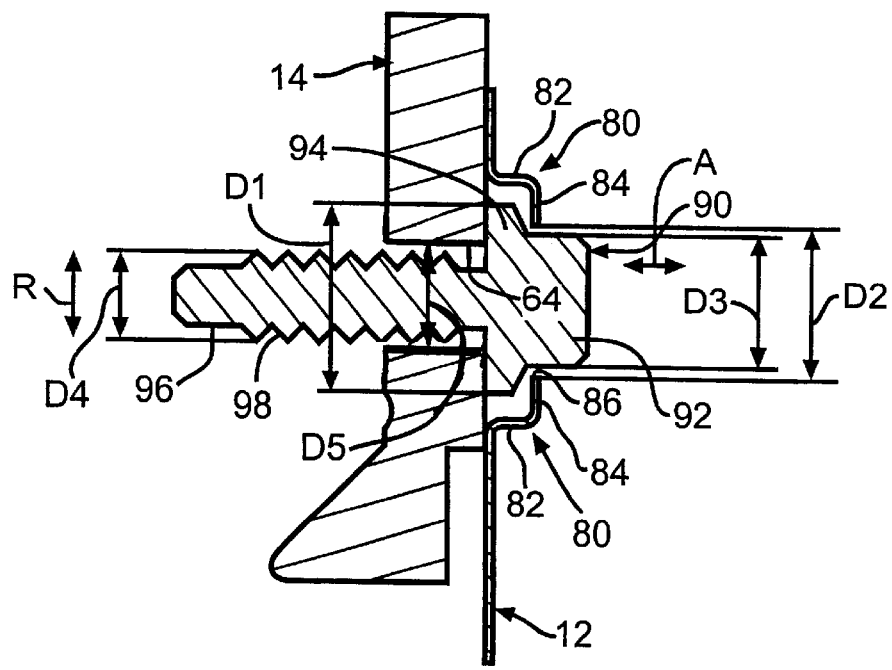
FIG. 5 is a sectional view taken along line 5—5 of FIG. 1.
Figure 6:
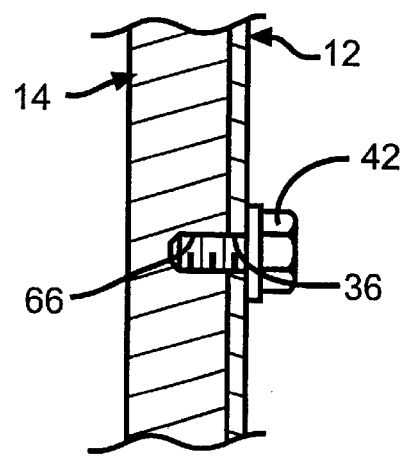
FIG. 6 is a sectional view taken along line 6—6 of FIG. 1.

The drum-in-hat adapter 14 is preferably formed from cast iron and includes a relatively large central opening 62, a first plurality of holes 64 formed therein about the central opening 62, and a second plurality of holes 66 formed therein. In the illustrated embodiment, the drum-in-hat adapter 14 is provided with four of such first holes 64 (only one of such holes 64 is illustrated in FIG. 5) and three of such second holes 66 (only one of such second holes 66 is illustrated in FIG. 6). The first holes 66 of the adapter 14 are formed to be in alignment with the holes 24 of the backing plate 12 for a purpose to be discussed below. In the illustrated embodiment, the holes 66 of the drum-in-hat adapter 14 are preferably threaded holes for a purpose to be discussed below.

In the illustrated embodiment, the adapter 14 also includes a generally elongated, slotted opening (not shown) and a pair of outwardly extending arms 70 and 72. The elongated slotting opening is adapted to allow the lever 34 of the actuator mechanism to pass therethrough. The arms 70 and 72 include respective openings 70A and 72A and are adapted to receive suitable fasteners (not shown) to support and secure a brake caliper assembly (not shown) of the drum-in-hat disc brake assembly 10 to the adapter 14. Alternatively, the structure of the drum-in-hat adapter 14 can be other than illustrated if so desired.

Figure 4:
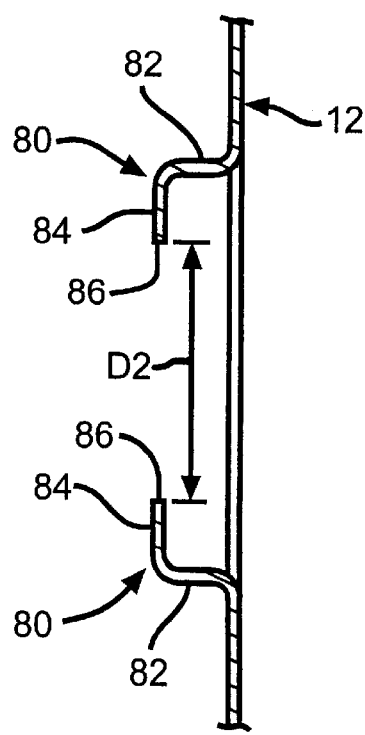
FIG. 4 is a sectional view of taken along line 4—4 of FIG. 3.

In accordance with the present invention, each of the openings 22 provided in the backing plate 12 includes a plurality of raised tabs or projections 80 formed integral therewith by a suitable metal forming process. In the illustrated embodiment, each of the openings 22 is provided with two of such raised tabs 80. Preferably, the tabs 80 are formed during by stamping process. As best shown in FIG. 4, each tab 80 is of a generally L-shape and includes a first leg or surface 82 and a second leg or surface 84. The second leg 84 of the tab 80 terminates at an endmost surface 86. In the illustrated embodiment, the first leg 82 extends generally perpendicular to the backing plate 12 and the second leg 84 extends generally parallel to the backing plate 12. Also, the endmost surfaces 86 of the tabs defines a distance D2 therebetween. Alternatively, the number, location and/or the structure of the openings 22 and/or the tabs 80 can be other than illustrated if so desired. For example, each of the openings 22 could include more than or less than the two tabs 80 illustrated in connection with this embodiment.

In accordance with the present invention, the mounting stud retention system will be discussed. As best shown in FIG. 5, a suitable fastener 90 is initially installed in each of the openings 64 provided in the drum-in-hat adapter 14. In the illustrated embodiment, the fastener 90 is a mounting stud or bolt having a hex-shaped head 92, a flange 94, and a body portion 96 provided with threads 98 along a portion thereof. As shown in FIG. 5, the flange 94 defines a dimension D1 and the head 92 defines a dimension D3.

Following this, the backing plate 12 is secured to the drum-in-hat adapter 14. To accomplish this, as best shown in FIG. 6, a threaded fastener 42 extends through each of the opening 36 provided in the backing plate 12 and is received in the associated threaded opening 66 provided in the drum-in-hat adapter 14. Alternatively, other methods can be used to secure the backing plate 12 to the drum-in-hat adapter 14. For example, self-tapping screws (not shown) and bolts and nuts (not shown) can be if so desired. As can be best seen in FIG. 5, the tabs 80 of the backing plate 12 of the mounting stud retention system of the present invention are operative to capture or retain the mounting stud 90 in its installed position. This is due to the distance D3 defined between the endmost surfaces 86 of the tabs 80 being less than the distance D1 defined by the flange 94 of the mounting stud 90. Thus, it can be seen that the mounting stud retention system of the present invention is effective to capture the stud 90 in the installed position while still permitting rotational movement of the stud 90 by a suitable tool to thereby enable the studs 90 to secure the brake assembly to the associated vehicle component.

Preferably, the threaded body portion 96 of the mounting stud 90 defines a thread outer diameter D4 which is slightly less than an inner diameter D5 of the opening 64. This allows the threaded body portion 96 of the stud 90 to be disposed in the opening 64 with some free play or movement of the stud 90 within the opening 64 in a generally radial direction, as indicated by arrow R in FIG. 5. This allows the mounting stud 90 to be aligned with and threadably installed into the associated threaded component provided on the vehicle. Preferably, the thread outer diameter D4 is around 0.25 mm less than the opening inner diameter D5. In addition, as best shown in FIG. 5, the flange 94 of the stud 90 is slightly spaced from the associated surface 84 of the raised tab 80 to allow for some free play or movement of the stud in a generally axial direction, as indicated by arrow A in FIG. 5.

Figure 7:
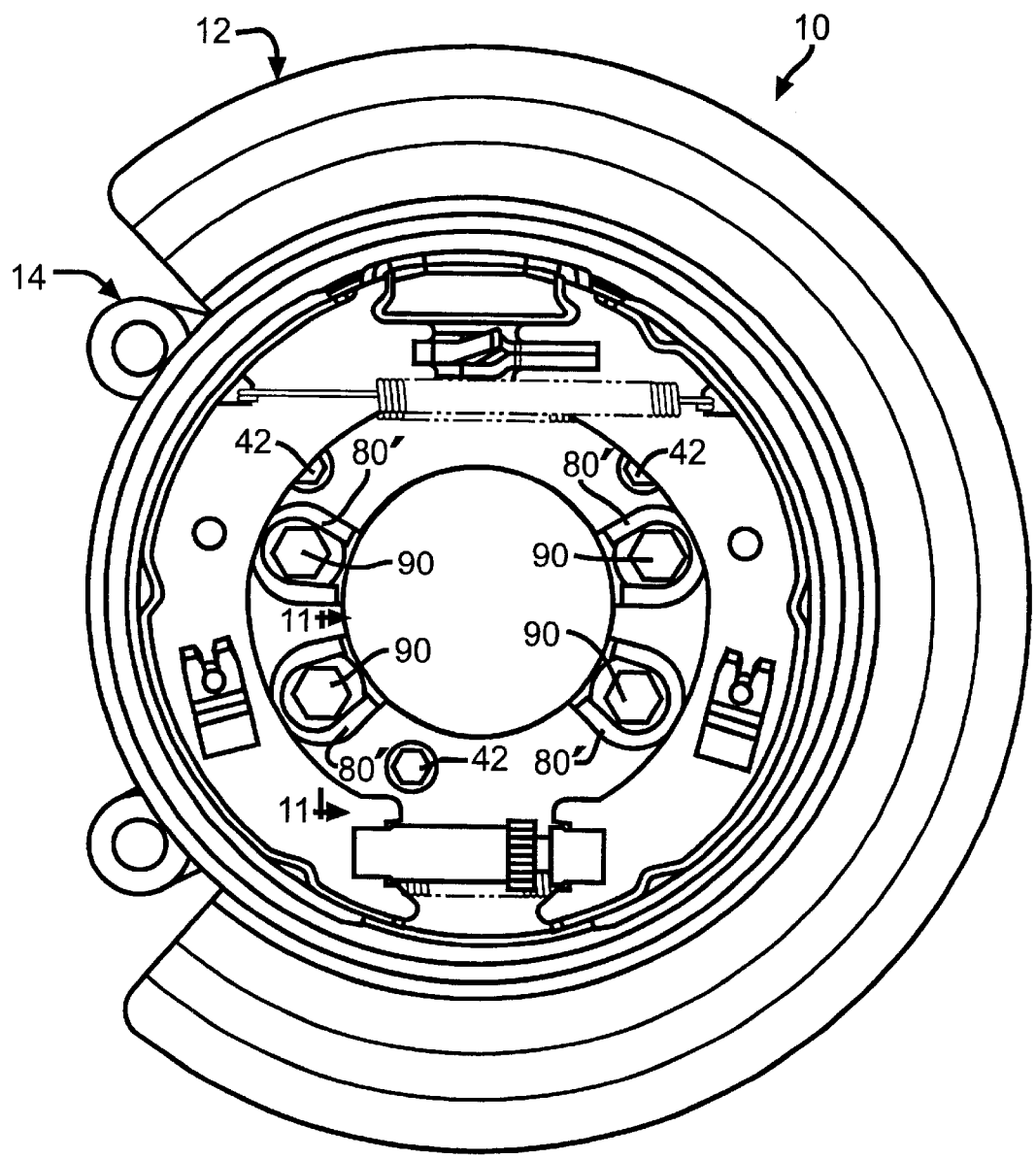
FIG. 7 is a plan view of a portion of a drum-in-hat disc brake assembly including a second embodiment of a mounting stud retention system in accordance with the present invention.
Figure 8:
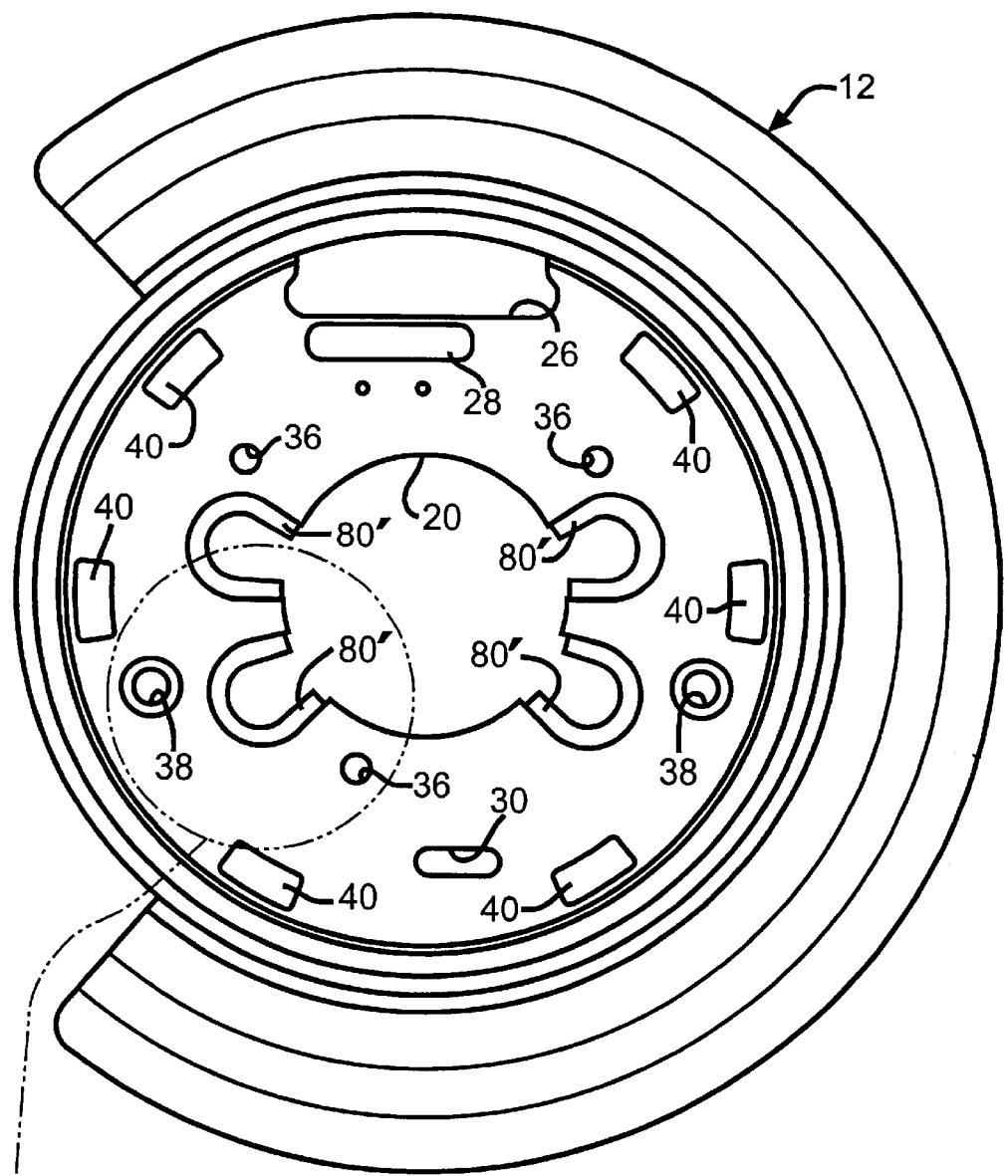
FIG. 8 is a plan view of the backing plate illustrated in FIG. 7.

Turning now to FIG. 7 and using like reference numbers to indicate corresponding parts, there is illustrated a portion of a drum-in-hat disc assembly, indicated generally at 10, including a second embodiment of a mounting stud or bolt retention system in accordance with the present invention. In this embodiment, each of the openings 22 provided in the backing plate 12 includes a raised lip or flange 80' formed integral therewith by a suitable metal forming process. Preferably, the lip 80' is formed during by stamping process.

In the illustrated embodiment and as best shown in FIGS. 9 and 10, each lip 80' is a continuous lip and extends generally around the entire circumference of the associated opening 22. In the illustrated embodiment, each lip 80' is generally L-shape in section and includes a first leg or surface 82' and a second leg or surface 84'. In the illustrated embodiment, the first leg 82' extends generally perpendicular to the backing plate 12 and the second leg 84' extends generally parallel to the backing plate 12. Also, the second leg 84' of the tab 80' terminates at an endmost surface 86'. Alternatively, the number, location and/or the structure of the openings 22 and/or the lip 80' can be other than illustrated if so desired. For example, the lip 80' could extend only partially around the opening 22 if so desired.

Figure 11:
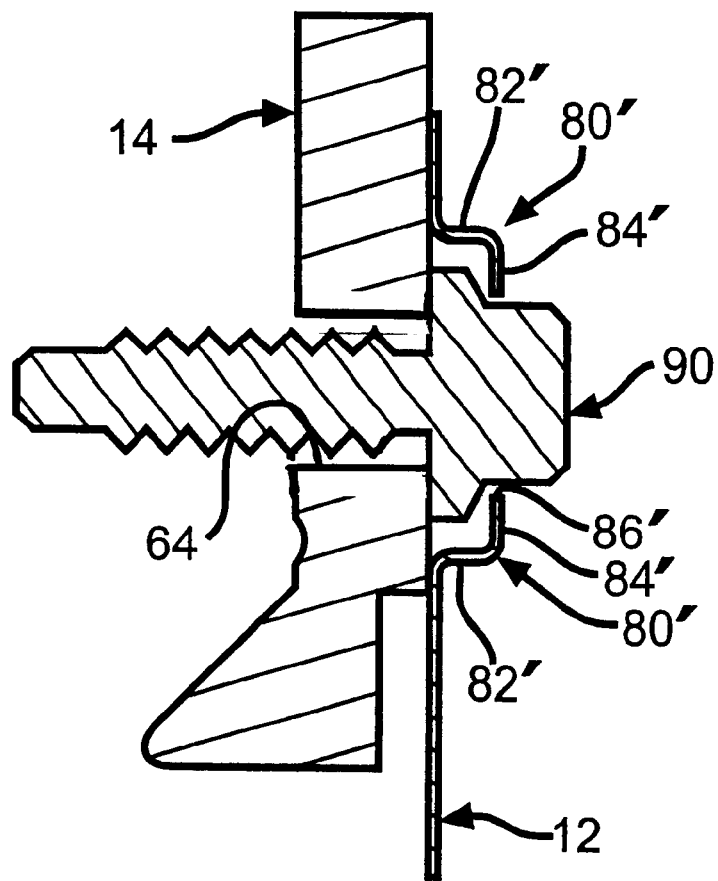
FIG. 11 is a sectional view taken along line 11—11 of FIG. 7.

As shown in FIG. 11, when the mounting stud 90 is installed in the opening 64 provided in the drum-in-hat adapter 14 and the backing plate is secured to the drum-in-hat adapter 14 by the fasteners 42, the lip 80' of the backing plate 12 of the mounting stud retention system of the present invention is operative to capture or retain respective mounting stud 90 in its installed position.

One advantage of the mounting stud retention system of the present invention is that it allows the mounting studs 90 to be disposed in the openings 64 of the drum-in-hat adapter 14 with no force applied. Also, the mounting stud retention system of the present invention allows the mounting studs 90 to used to secure the brake assembly 10 to the associated vehicle component, such as an axle flange or steering knuckle, without having the studs 90 applying a clamping load to the backing plate 12.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle drum-in-hat disc brake assembly mounting stud retention system comprising:

a backing plate adapted to support a drum brake shoe assembly of a drum-in-hat parking and emergency brake portion of the drum-in-hat disc brake assembly, said backing plate having a centrally located aperture and a plurality of first openings formed therein about said centrally located aperture thereof and a plurality of second openings formed therein, each of said first openings having at least one raised tab provided thereon adjacent said opening;

a drum-in-hat adapter adapted to support a disc service brake portion of the drum-in-hat disc brake assembly, said drum-in-hat adapter having a centrally located aperture and a plurality of openings adapted to be aligned with said first openings of said backing plate;

a fastener extending through each of said second openings of said backing plate and into said drum-in-hat adapter to thereby secure said backing plate to said drum-in-hat adapter; and a mounting stud disposed in and extending through each of said first openings of said backing plate and said openings of said drum-in-hat adapter to thereby secure said drum-in-hat adapter to an associated component of the vehicle;

wherein said raised tab of said backing plate is operative to capture and retain said mounting stud in said openings of said backing plate and said drum-in-hat adapter prior to assembly of said vehicle drum-in-hat disc brake assembly to the vehicle.

2. The mounting stud retention system according to claim 1 wherein each of said first openings has a pair of spaced apart raised tabs formed integrally with said backing plate.

3. The mounting stud retention system according to claim 1 wherein said raised tab is a continuous lip and extends generally around the entire circumference of each of said first openings of said backing plate.

4. The mounting stud retention system according to claim 1 wherein said mounting stud is disposed in said opening of said drum-in-hat adapter with free play relative thereto in at least one of a generally radial direction and a generally axial direction.

5. The mounting stud retention system according to claim 1 wherein said raised tab captures and retains said mounting stud in said openings of said backing plate and said drumin-hat adapter prior to assembly of said vehicle drum-in-hat disc brake assembly to the vehicle with no force being applied to said backing plate and said drum-in-hat adapter by said mounting stud.

6. The mounting stud retention system according to claim 1 wherein said mounting stud is operative to apply a clamping load only to the drum-in-hat adapter and not to said backing plate when said mounting stud is used to secure the vehicle drum-in-hat disc brake assembly to the vehicle.

7. The mounting stud retention system according to claim 1 wherein said mounting stud includes a head, a flange, and a body portion provided with threads along a portion thereof.

8. The mounting stud retention system according to claim 7 wherein said raised tab captures and retains said flange of said mounting stud, said head of said mounting stud projecting beyond said raised tab to allow a tool to be used to fasten said mounting stud to vehicle.

9. The mounting stud retention system according to claim 1 wherein said drum-in-hat adapter includes a plurality of threaded openings and said fastener for securing said backing plate to said drum-in-hat adapter is a threaded fastener installed in said threaded opening of said drum-in-hat adapter.

10. The mounting stud retention system according to claim 1 wherein said raised tab is formed integrally with said backing plate.

11. A vehicle drum-in-hat disc brake assembly mounting stud retention system comprising:

a backing plate adapted to support a drum brake shoe assembly of a drum-in-hat parking and emergency brake portion of the drum-in-hat disc brake assembly, said backing plate having a centrally located aperture and a plurality of first openings formed therein about said centrally located aperture thereof and a plurality of second openings formed therein, each of said first openings having at least one raised tab formed integrally with said backing plate;

a drum-in-hat adapter adapted to support a disc service brake portion of the drum-in-hat disc brake assembly, said drum-in-hat adapter having a centrally located aperture and a plurality of openings adapted to be aligned with said first openings of said backing plate;

a fastener extending through each of said second openings of said backing plate and into said drum-in-hat adapter to thereby secure said backing plate to said drum-in-hat adapter; and a mounting stud disposed in and extending through each of said first openings of said backing plate and said openings of said drum-in-hat adapter to thereby secure said drum-in-hat adapter to an associated component of the vehicle;

wherein said raised tab of said backing plate is operative to capture and retain said mounting stud in said openings of said backing plate and said drum-in-hat adapter prior to assembly of said vehicle drum-in-hat disc brake assembly to the vehicle and said mounting stud is disposed in said opening of said drum-in-hat adapter with free play relative thereto in at least one of a generally radial direction and a generally axial direction.

12. The mounting stud retention system according to claim 11 wherein each of said first openings has a pair of spaced apart raised tabs formed integrally with said backing plate.

13. The mounting stud retention system according to claim 11 wherein said raised tab is a continuous lip and extends generally around the entire circumference of each of said first openings of said backing plate.

14. The mounting stud retention system according to claim 11 wherein said raised tab captures and retains said mounting stud in said openings of said backing plate and said drum-in-hat adapter prior to assembly of said vehicle drum-in-hat disc brake assembly to the vehicle with no force being applied to said backing plate and said drum-in-hat adapter by said mounting stud.

15. The mounting stud retention system according to claim 11 wherein said mounting stud is operative to apply a clamping load only to the drum-in-hat adapter and not to said backing plate when said mounting stud is used to secure the vehicle drum-in-hat disc brake assembly to the vehicle.

16. A vehicle drum-in-hat disc brake assembly mounting stud retention system comprising:

a backing plate adapted to support a drum brake shoe assembly of a drum-in-hat parking and emergency brake portion of the drum-in-hat disc brake assembly, said backing plate having a centrally located aperture and a plurality of first openings formed therein about said centrally located aperture thereof and a plurality of second openings formed therein, each of said first openings having at least one raised tab provided thereon adjacent said opening;

a drum-in-hat adapter adapted to support a disc service brake portion of the drum-in-hat disc brake assembly, said drum-in-hat adapter having a centrally located aperture and a plurality of openings adapted to be aligned with said first openings of said backing plate;

a fastener extending through each of said second openings of said backing plate and into said drum-in-hat adapter to thereby secure said backing plate to said drum-in-hat adapter; and a mounting stud disposed in and extending through each of said first openings of said backing plate and said openings of said drum-in-hat adapter to thereby secure said drum-in-hat adapter to an associated component of the vehicle;

wherein said raised tab of said backing plate is operative to capture and retain said mounting stud in said openings of said backing plate and said drum-in-hat adapter prior to assembly of said vehicle drum-in-hat disc brake assembly to the vehicle with no force being applied to said backing plate and said drum-in-hat adapter by said mounting stud and wherein said mounting stud is operative to apply a clamping load only to the drum-in-hat adapter and not to said backing plate when said mounting stud is used to secure the vehicle drum-in-hat disc brake assembly to the vehicle.

17. The mounting stud retention system according to claim 16 wherein each of said first openings has a pair of spaced apart raised tabs formed integrally with said backing plate.

18. The mounting stud retention system according to claim 16 wherein said raised tab is a continuous lip and extends generally around the entire circumference of each of said first openings of said backing plate.

19. The mounting stud retention system according to claim 16 wherein said mounting stud is disposed in said opening of said drum-in-hat adapter with free play relative thereto in at least one of a generally radial direction and a generally axial direction.

20. The mounting stud retention system according to claim 16 wherein said raised tab is formed integrally with said backing plate.

* * * * *